(12) United States Patent
Vasylyev

(10) Patent No.: US 9,010,945 B2
(45) Date of Patent: Apr. 21, 2015

(54) RETROREFLECTIVE LENTICULAR ARRAYS

(75) Inventor: Sergiy Victorovich Vasylyev, Elk Grove, CA (US)

(73) Assignee: SVV Technology Innovations, Inc., Elk Grove, CA (US)

( * ) Notice: Subject to any disclaimer, the term of this patent is extended or adjusted under 35 U.S.C. 154(b) by 340 days.

(21) Appl. No.: 13/279,278

(22) Filed: Oct. 22, 2011

(65) Prior Publication Data

US 2012/0099199 A1    Apr. 26, 2012

Related U.S. Application Data

(60) Provisional application No. 61/455,578, filed on Oct. 22, 2010.

(51) Int. Cl.
*G02B 5/12* (2006.01)
*B29D 11/00* (2006.01)
*G02B 5/124* (2006.01)

(52) U.S. Cl.
CPC ............ *G02B 5/12* (2013.01); *Y10T 156/10* (2015.01); *B29D 11/00278* (2013.01); *B29D 11/00605* (2013.01); *G02B 5/124* (2013.01)

(58) Field of Classification Search
USPC .................................. 359/515–553, 462–479
See application file for complete search history.

(56) References Cited

U.S. PATENT DOCUMENTS

| | | | | |
|---|---|---|---|---|
| 2,562,077 | A | * | 7/1951 | Winnek ........................ 355/22 |
| 3,002,051 | A | * | 9/1961 | Tait .............................. 348/284 |
| 4,525,029 | A | * | 6/1985 | Inoue et al. .................. 359/457 |
| 5,237,449 | A | | 8/1993 | Nelson et al. |
| 5,457,574 | A | * | 10/1995 | Eichenlaub ................... 359/619 |
| 5,501,545 | A | | 3/1996 | Walter |
| 5,896,230 | A | | 4/1999 | Goggins |
| 2006/0291050 | A1 | * | 12/2006 | Shestak et al. ............... 359/443 |
| 2007/0103799 | A1 | | 5/2007 | Chiang et al. |
| 2007/0104911 | A1 | | 5/2007 | Chiang et al. |
| 2009/0097114 | A1 | | 4/2009 | Mimura et al. |
| 2009/0153959 | A1 | * | 6/2009 | Tao et al. ..................... 359/463 |
| 2009/0168165 | A1 | * | 7/2009 | Hoffman ...................... 359/463 |
| 2009/0168187 | A1 | * | 7/2009 | Woodgate et al. ........... 359/623 |

* cited by examiner

Primary Examiner — Jennifer L. Doak

(57) ABSTRACT

Retroreflective lenticular systems employing a focusing array and a retroreflector array optically coupled to the focusing array. The focusing array is provided on a first surface and the retroreflector array is provided on an opposing second surface. The retroreflector array includes an array of retroreflective elements alternating with separation areas and disposed in energy exchange relationship with respect to the focusing array. The focusing array includes a plurality of focusing lenses configured to illuminate only the retroreflective elements with focused beams at least at some angles and to focus the incident beam only onto the separation areas at other angles. The intermittent illumination of retroreflective elements provides variable retroreflectivity of at least portions of the system and enhances the system visibility and conspicuity in the reflected light.

16 Claims, 10 Drawing Sheets

RETROREFLECTIVE LENTICULAR ARRAYS

CROSS-REFERENCE TO RELATED APPLICATIONS

This application claims priority from U.S. provisional application Ser. No. 61/455,578 filed on Oct. 22, 2010, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates to a device and method employing lenticular retroreflective structure that can produce a flashing effect or alternately display various patterns, symbols or images in variable brightness for a spectator depending on a position of the spectator's eye relative to the device and to the location of the light source. More particularly, this invention relates to the road signs, safety markings, signaling reflectors, visual advertising displays and the like.

2. Description of Background Art

Numerous applications exist including the passive (non-illuminated) road signs, safety markings and similar devices hereinafter collectively referred to as "signs" that are made to catch the attention of the spectators, such as vehicle drivers, approaching these devices from a distance. Since a wide range of applications exist for the present invention in relation to enhancing the visibility of signs, for the sake of simplicity of expression and without limiting generality of this invention, the prior art and preferred embodiments will now be described using an example of a road sign and its visibility for the driver in an approaching vehicle.

Since the sign visibility at night is especially problematic, the signs can include various retroreflective backings, particularly in the form of a highly reflective film that enhances the sign visibility due to the efficient reflection of the light from the car headlamps back to the driver of the respective car. The conventional signs, however, are static and only capable of displaying only a single pattern or image that can be seen by the driver, and usually only in one color. While these conventional solutions improve the apparent brightness of the signs, they lack any dynamic effects such as flashing or a rapid succession of different patterns or images. Furthermore since the typical light sources, such as headlamps of a car or truck, are steady in brightness, the brightness of retroreflected light also does not change appreciably.

Active systems employing flashing light sources usually provide the sufficient brightness variability to solve the visibility problem. However, the active light sources require constant energy supply which adds to the installation and operating costs. The energy requirement is especially problematic in remote areas with no power lines and where the maintenance and energy supply can be limited. Therefore, it would be advantageous to provide the capability for the signs to display alternating brightness levels, patterns, symbols or images without the added cost and complexity of active lighting.

Static lenticular devices or screens are known that provide a view of two or more images in succession using a set of lenses or prisms arranged in an array and a specially prepared image print underlying the lens array. These prior art devices allow the eye of the spectator to see only one set of areas of the print at a time, depending on the angular orientation of the spectator's line of sight with respect to the device. In these screens, a lenticular print obtained by interlacing two or more images is attached to or printed on the back of a lenticular lens array sheet. Interlacing involves dividing the source images into stripes and combining the striped images together so that the different source images can be alternately seen by an observer depending on the viewing angle. The combination of interlaced images and a lenticular lens array produce various visual effects such as flip, animation, 3D, morph and zoom.

However, the conventional lenticular screens are usually only capable of displaying the images that are printed in the back of the lens array and their ability to catch observer's eye is usually limited to changing the image content and colors only. The image prints are scattering light into all directions thus resulting in a much poorer visibility from a distance compared to the state-of-the art signs and markings having retroreflective capabilities. Therefore, the conventional lenticuar screens are ill suited for improving the visibility of road signs or for similar sign and display applications. In many applications, including, for example, commercial advertising or road signs, it will be advantageous to enhance the visibility of the screen and its dynamic image effects, especially when the ambient illumination is inadequate.

BRIEF SUMMARY OF THE INVENTION

The present invention solves the above problems by providing a retroreflective lenticular system including a focusing array optically coupled to a plurality of retroreflective areas alternating with separation areas. The retroreflective lenticular system has one or more regions of variable retroreflectivity which produce various dynamic visual effects when illuminated by a moving light source. The focusing array and the array or retroreflective areas can be associated with two planar surfaces or layers which are spaced apart from each other and disposed in optical energy exchange relationship.

According to at least one aspect of the present invention, the focusing array can be associated with a frontal surface of a sheet or plate of transmissive material and the array or retroreflective areas can be associated with an opposing surface of the sheet or plate. According to another aspect, the focusing array may include a lenticular lens array separated from the array or retroreflective areas by one or more layers of transparent or translucent materials and/or air. The plurality or retroreflective areas may comprise an ordered array of retroreflective areas, such as retroreflective strips or bands, alternating with separation areas.

Each of the retroreflective areas can have one or more retroreflectors, such as cube-corners, glass spheres or right-angle prisms which reflect the light essentially into the same direction as the direction of the incidence. The retroreflectors reflect back a substantial portion of light entering the focusing array thus enhancing the visual brightness. Furthermore, as the approaching vehicle changes the illumination and viewing angle relatively to the retroreflective lenticular system, the retroreflective areas and the separation areas are exposed to the driver's view in succession, thus providing substantial changes in the apparent brightness of the system or it portions. By defining different patterns of by suitable interlacing of retroreflective areas and separation areas, various visual effects can be obtained in enhanced brightness, such as flashing, flip, animation, and the like.

The retroreflective lenticular system can have one or more dynamic effect areas in which the individual focusing elements of the focusing array are preferably arranged relative to the retroreflective areas and the separation areas so that a substantial portion of incident light is focused or superimposed on either the retroreflective areas or the separation areas, resulting in varying cumulative retroreflection from the dynamic effect areas. By suitable interlacing of the retroreflective areas and the separation areas in accordance with the pitch of the focusing elements in the focusing array, the entire dynamic area can be made variable in brightness and/or color. In addition, various patterns, symbols and image content can be encoded by the interlaced retroreflective and separation areas so that multiple image frames can be displayed in succession and in varying brightness levels, thus enhancing the conspicuity and visibility of the device incorporating the retroreflective lenticular system of the present invention.

The invention is amenable to being embodied in a number of ways, including but not limited to the following descriptions.

In one aspect, the invention provides a retroreflective lenticular system configured as a retroreflective lenticular lens array. The array comprises a first surface including a plurality of light focusing structures and a second surface comprising a plurality of retroreflective areas alternating with separation areas. The light focusing structures are configured to focus incident light onto the second surface and each of the retroreflective areas is configured to retroreflect light towards the first surface. In some aspects, the first and second surfaces represent a front surface and a rear surface of a planar lens array, respectively. In at least some implementations, the first surface is parallel to the second surface.

In at least some implementations, the retroreflective areas and separation areas can form a repeating pattern or interlaced pattern. In at least one further implementation, the pitch of the plurality of light focusing structures is a multiple of the pitch of the plurality of retroreflective areas. In at least one yet further implementation, the multiple is an integer number greater than 1. In at least one implementation, the transversal width of each of the plurality of retroreflective areas is substantially equal to the width of each of the separation areas.

In at least one implementation, the light focusing structures comprise cylindrical lenses arranged in parallel columns. In a further variation of the lens array, the light focusing structures comprise point-focus lenses arranged in rows and columns. In at least some implementations, the linear focusing structures can be configures in various shapes and may comprise various optical elements including imaging lenses, non-imaging lenses, spherical lenses, aspherical lenses, lens arrays, Fresnel lenses, TIR lenses, gradient index lenses, diffraction lenses, mirrors, Fresnel mirrors, spherical mirrors, parabolic mirrors, mirror arrays, and trough mirrors.

In at least one implementation, each of the plurality of retroreflective areas comprises a plurality of retroreflective elements. In at least one implementation, each of the separation areas exhibits different optical properties than the retroreflective areas. Further variations of separation areas include areas opaque to the incident light and areas essentially transparent to the incident light. Each of the separation areas can also be made retroreflective and having different retroreflective characteristics than the retroreflective areas.

In at least one implementation, the retroreflective lenticular lens array can include at least one region comprising a plurality of retroreflective areas alternating with separation areas in an interlaced sequence to display one or more dynamic visual effect selected from the group of visual effects consisting of flashing, color change, flip, animation, 3D, morph and zoom.

In another aspect, the present invention provides a retroreflective lenticular system having a layered structure and comprising an optical layer, a reflective layer comprising retroreflective elements, and an interlaced optical mask provided between the optical layer and the reflective layer. The optical layer has a plurality of light focusing structures and the reflective layer comprises retroreflective elements.

In at least one implementation, the optical layer comprises an array of point-focus lenses. In another implementation, the optical layer comprises a linear lens array including refractive cylindrical lenses. Further implementations include various light focusing structures. Particularly, the light focusing structures can be selected from the group of optical elements consisting of imaging lenses, non-imaging lenses, spherical lenses, aspherical lenses, lens arrays, Fresnel lenses, TIR lenses, gradient index lenses, diffraction lenses, mirrors, Fresnel mirrors, spherical mirrors, parabolic mirrors, mirror arrays, and trough mirrors.

Yet further implementations add various layers to the retroreflective lenticular system, particularly, one or more layers of optically transparent adhesive and/or one or more protective layers.

At least some implementations include different variations of the interlaced mask. In one variation, the interlaced mask comprises alternate areas having different optical properties. In another variation, the mask comprises a plurality of transparent areas alternating with separation areas. The separation areas are configured to exhibit one or more of the following optical properties: refraction, reflection, scattering, diffusing, polarization, diffraction, color filtering, and light bending. In a yet another variation, the interlaced mask comprises alternate opaque and transparent areas. In a yet another variation, the interlaced mask may comprise a repeating pattern. A variant of the interlaced mask comprises a plurality of spaced apart retroreflective areas such that the pitch of the plurality of light focusing structures is a multiple of the pitch of the plurality of retroreflective areas. Another variant of the interlaced mask represents an inverted interlaced image content, with a yet another variant being additionally configured to display at least one dynamic visual effect selected from the group of visual effects consisting of flashing, color change, flip, animation, 3D, morph and zoom.

In at least some implementations, the layered structure can have a planar configuration or a curved configuration.

In another aspect, the present invention provides a method of manufacturing an optical article for displaying surface portions in varying brightness under illumination by a moving distant source of light. The method comprises providing a lenticular lens array, providing a retroreflective layer in combination with the lenticular lens array, and forming an inverted interlaced mask between the lenticular lens array and the retroreflective layer, where the inverted interlaced mask encodes the sequence of varying brightness. In at least one implementation, the inverted interlaced mask comprises a process selected from the group consisting of offset printing, digital printing, and laminating.

Further aspects and implementations of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 12A:
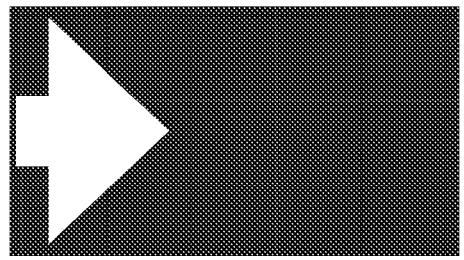
Figure 12B:
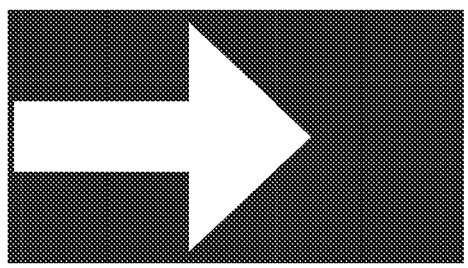
Figure 12C:
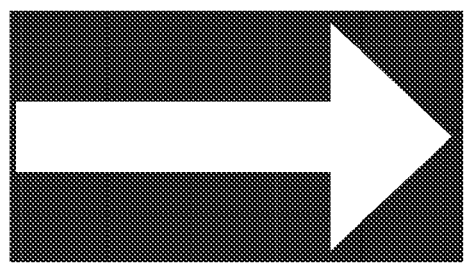
Figure 13:
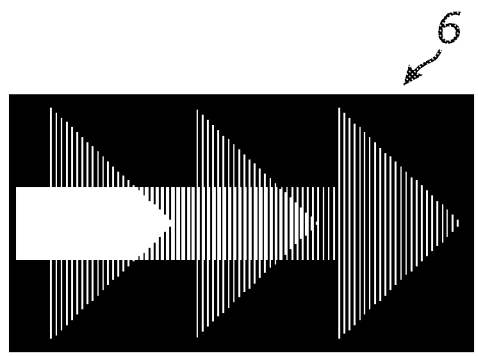
Figure 14:
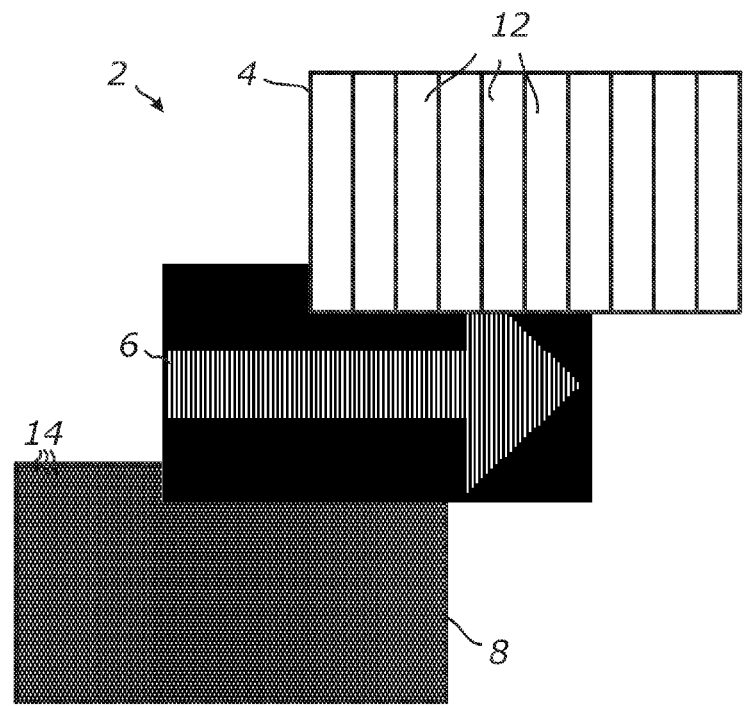
Figure 15:
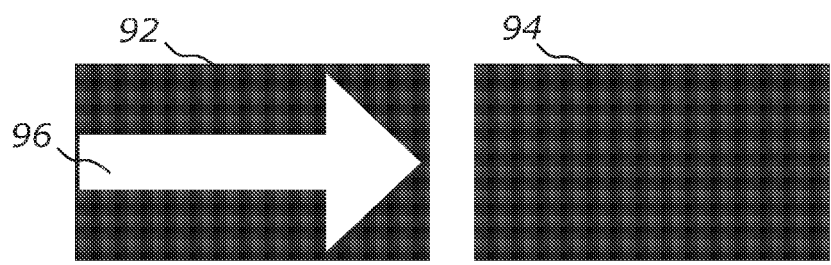

FIG. 12A, FIG. 12B, and FIG. 12C are schematic views of different frames of an exemplary image content comprising an arrow in various positions in relation to a surface of a retroreflective lenticular system, according to at least one embodiment of the present invention;

FIG. 13 is a schematic view illustrating an interlaced image and an interlaced mask encoding the image frames shown in FIG. 12A through FIG. 12C, according to at least one embodiment of the present invention;

FIG. 14 is a schematic exploded view of a retroreflective lenticular system, showing an alternative pattern of an interlaced mask configured for providing a visual effect of a flashing arrow, according to at least one embodiment of the present invention;

FIG. 15 is a schematic view of image frames encoded in the interlaced mask of FIG. 14.

Figure 16:
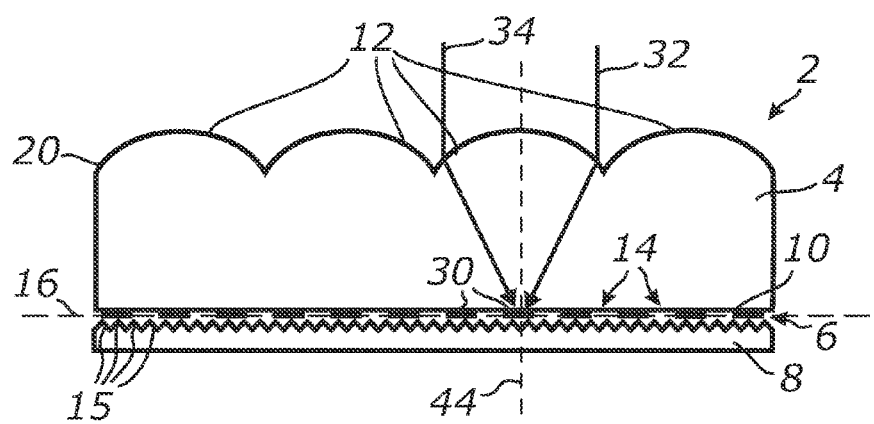
Figure 17:
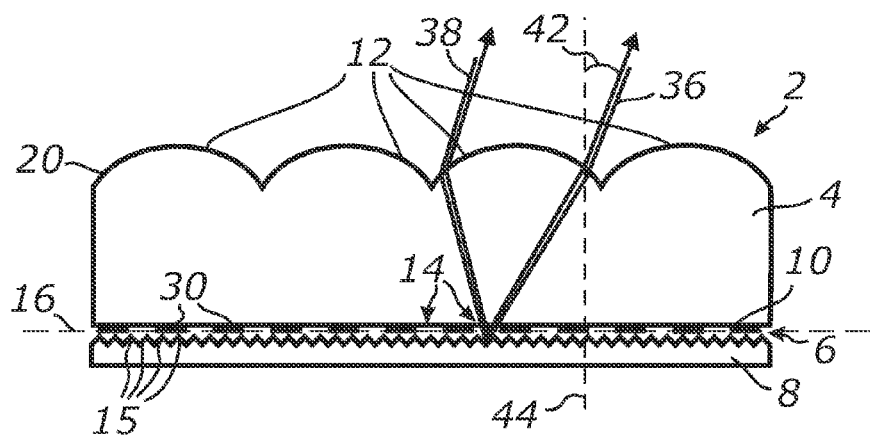
Figure 18:
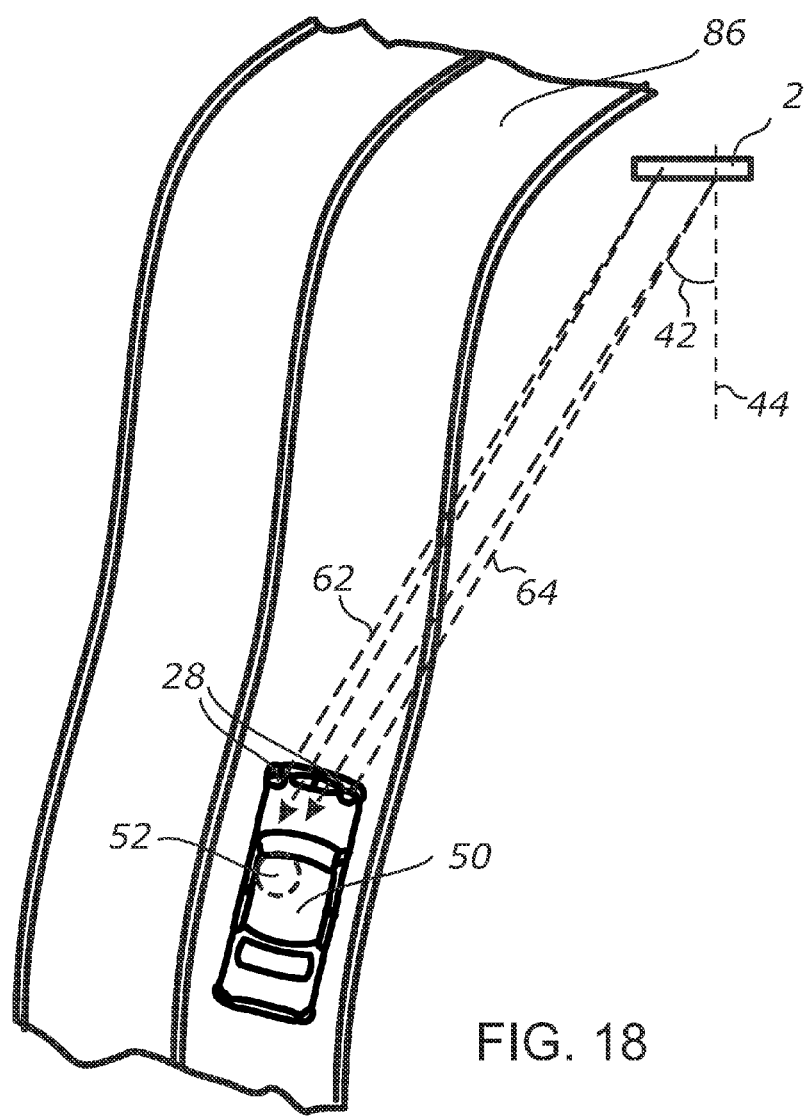
Figure 19:
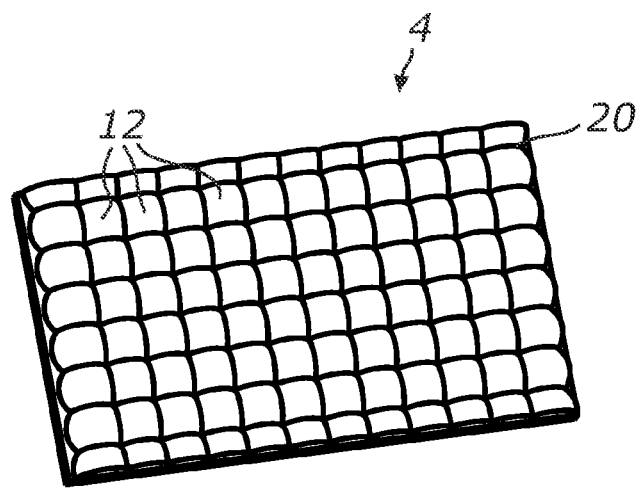
Figure 20:
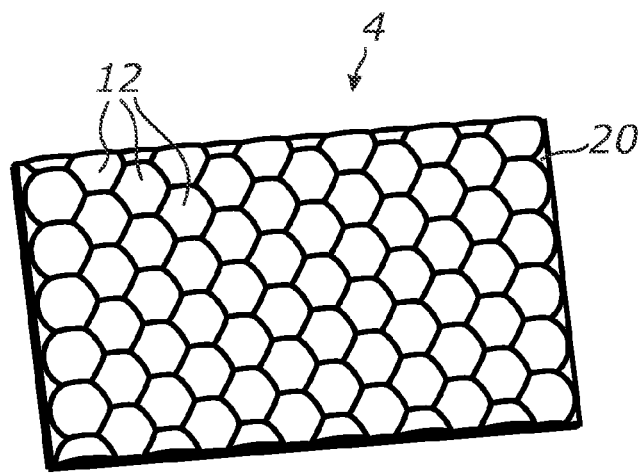
Figure 21:
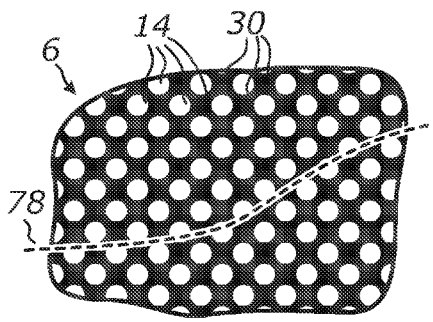
Figure 22:
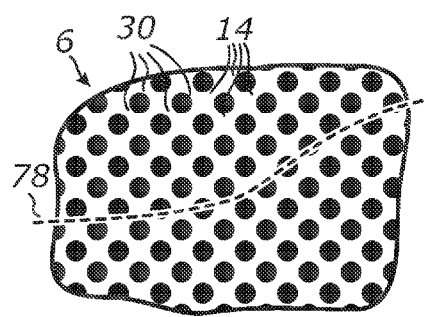
Figure 23:
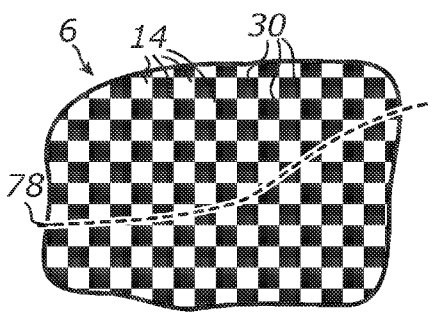
Figure 24:
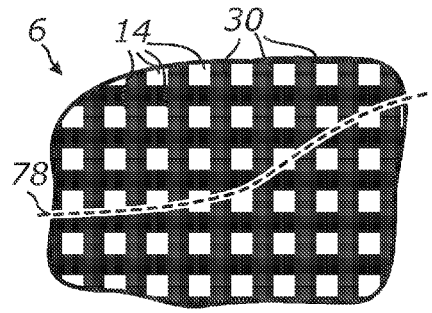
Figure 25:
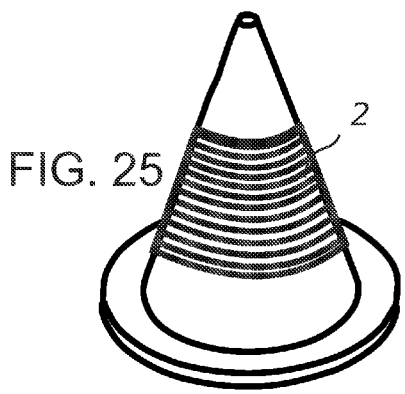
Figure 26:
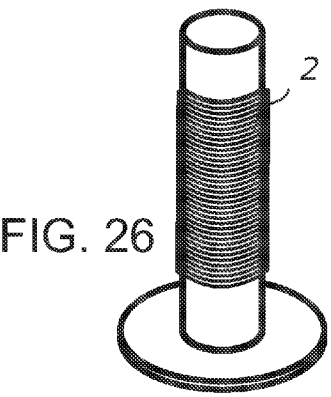

FIG. 16 is a schematic view, in a cross-section, and ray tracing of a retroreflective lenticular system illuminated by light rays at near-normal incidence, according to at least one embodiment of the present invention;

FIG. 17 is a schematic view, in a cross-section, and ray tracing of a retroreflective lenticular system illuminated by light rays at a different angle with respect to a normal than in FIG. 16, according to at least one embodiment of the present invention;

FIG. 18 is a schematic view showing an example of using a retroreflective lenticular system for a road sign, according to at least one embodiment of the present invention;

FIG. 19 is a schematic view of a lens array showing point-focus configuration of lenses, according to at least one embodiment of the present invention;

FIG. 20 is a schematic view of a lens array showing alternative shape and arrangement of point-focus lenses, according to at least one embodiment of the present invention;

FIG. 21 is a schematic view of an interlaced mask portion, according to at least one embodiment of the present invention;

FIG. 22 is a schematic view of an interlaced mask portion, showing an alternative pattern of retroreflective areas and separation areas, according to at least one embodiment of the present invention;

FIG. 23 is a schematic view of an interlaced mask portion, showing another alternative pattern of retroreflective areas and separation areas, according to at least one embodiment of the present invention;

FIG. 24 is a schematic view of an interlaced mask portion, showing a yet another alternative pattern of retroreflective areas and separation areas, according to at least one embodiment of the present invention;

FIG. 25 is a schematic view of a retroreflective lenticular system applied to a road warning cone, according to at least one embodiment of the present invention;

FIG. 26 is a schematic view of a retroreflective lenticular system applied to a road marker pole, according to at least one embodiment of the present invention.

DETAILED DESCRIPTION OF THE INVENTION

Referring more specifically to the drawings, for illustrative purposes the present invention is embodied in the apparatus generally shown in the preceding figures. It will be appreciated that the apparatus may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

According to a preferred embodiment of the present invention, a retroreflective lenticular system is provided that can provide flashing effects or display multiple patterns, symbols or image contents in succession and in variable brightness and/or can provide various attention-catching effects such as flip or animation when being illuminated by the headlamps of an approaching vehicle.

Figure 1:
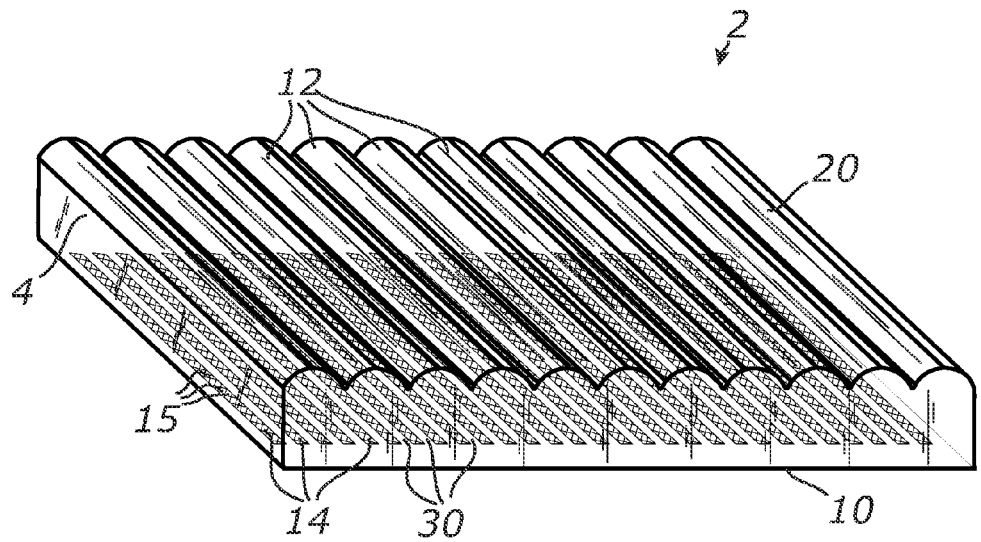
FIG. 1 is a schematic perspective view of a retroreflective lenticular system, according to at least one embodiment of the present invention.

FIG. 1 illustrates an embodiment of a retroreflective lenticular system 2 than can provide various dynamic visual effects enhanced by the lights of an approaching vehicle. Retroreflective lenticular system 2 comprises an optically transmissive body including a front surface 20, an opposing rear surface 10 and a plurality of focusing structures. The optically transmissive body is exemplified by a linear lens array 4 and the plurality of focusing structures is exemplified by cylindrical lenses 12 formed in front surface 20 and arranged in parallel columns. System 2 further comprises an ordered array of retroreflective areas 14 formed in rear surface 10 of lens array 4 and arranged in equally-spaced strips or bands extending parallel to lenses 12. Retroreflective areas 14 are alternating with separation areas 30 forming together an interlaced pattern of retroreflective and separation strips. Each retroreflective area 14 includes a plurality of retroreflective optical elements exemplified by retroreflectors 15 formed in surface 10 of lens array 4.

Lens array 4 can be made from of a sheet or planar plate or slab of a transparent material by appropriate contouring its frontal surface and obtaining surface relief features approximating individual refractive lenses 12. In an illustrative case shown in FIG. 1, lens array 4 is formed on a common transparent substrate. The lenses 12 can be of either imaging or non-imaging type, spherical, aspherical (corrected for spherical and/or chromatic aberrations) and can also be made in the form of Fresnel lenses for an improved flatness.

Also, any known light focusing structure which collects the energy from a larger area and focuses it to a substantially smaller focal area can be used to form individual elements of the focusing array. By way of example and not limitation, the individual elements of lens array 4 may comprise any of the following optical elements: refractive lenses, Fresnel lenses, TIR lenses, gradient index lenses, diffraction lenses, lens arrays, reflective surfaces, mirrors, Fresnel mirrors, mirror arrays and the like.

Lenses 12 are designed to have a substantial focusing power and configured to have an effective focal length approximating the thickness of lens array 4 so that each lens can focus a quasi-parallel beam of light into a narrow strip on or in the immediate vicinity of rear surface 10 of the lens array. When illuminated by a distant light source, lens array 4 can thus form a plurality of focal lines in a plane located at or near surface 10, each focal line having a substantially smaller width than the width of the respective lens.

For the purpose of illustration of this invention and from the practical standpoint, the terms "focal area" or "focus" of an individual lens 12 of focusing lens array 4 should be understood broadly and generally refers to an area within the envelope of the focused beam where said area has a cross section substantially smaller than the cross section of respective lens 12. Accordingly, the focal area can include areas at a relatively small distance from the "ideal" focus of the lens 12 and where the focused beam can be convergent (before focus) or divergent (after focus). The term "effective focal length" or "effective focal distance" is defined as the distance from the vertex of lens to its focus. As a practical consideration, the design of lens array 4 should allow for positioning the focal area with respect to the rear surface 10 within 10-20% of the array's thickness.

Each retroreflective area 14 can be formed by retroreflective texturing of surface 10 and may include one or more elementary retroreflective elements such as, for example, cube corners, prisms, V-grooves, embedded glass spheres and the like. In FIG. 1, each retroreflective area 14 is illustrated to be formed by a densely-packed array of cube-corner retroreflectors 15.

The width of each strip forming an individual reflective area 14 should preferably be substantially less than the width, or aperture, of each lens 12. More specifically, the width of each retroreflective area 14 should preferably be at least several times smaller than the lens width. At the same time, it is preferred that the width of each retroreflective area 14 is generally not less than the width of the focal area of lenses 12.

The transversal size of each retroreflector 15 should not generally exceed the width of the respective retroreflective area 14 in order to fit into the retroreflective in its entirety and fully provide the retroreflective function. On the other hand, the size of individual retroreflectors 15 can be selected to be fairly small compared to the width of retroreflective area 14, so that many such retroreflectors can be fit into each retroreflective area. It is thus also preferred that the transversal size of each individual retroreflector 15 is generally substantially smaller than the transversal size of each lens 12. By way of example and not limitation, the lens width can be around 2.5 mm, the width of each retroreflective area 14 can be 0.15 mm, and the transversal size of each retroreflector 15 can be made anywhere between 20 to 150 microns.

Lens array 4 may be formed from a sheet or continuous webs of optically transparent material by means of extrusion or hot pressing by an embossing roller or cylinder which surface is formed with the a negative replica of the suitable lenticular lens pattern. Any other methods may be used that are directed at creating a sufficiently optically transparent structure with a lenticular lens array surface pattern. Suitable materials for making lens array 4 include but are not limited to optical glass, PMMA (acrylic), silicone, polycarbonate, optical quality PET (polyethylene terephthalate), polystyrene, polyolefin, polyesters, APET, PETG, or PVC, as well as any optically clear resin which is obtainable by polymerization and curing of various compositions.

It should be understood that lens array 4 may also comprise a thicker plate or slab rather than a thin, flexible sheet, and can be made using any other suitable means for fabricating lens arrays. Particularly, lens array 4 can be made from a resin, melt or polymer using injection molding, compression molding, casting, replication, UV or heat curing, micro-machining, laser ablation, grinding, chemical etching, beam etching and the like.

The individual lenses 12 can be integrated with lens array 4 and preferably comprise the same material as the body of the array. Alternatively, lenses 12 can be disposed on a transparent substrate plate and fabricated of the same or a different material than the substrate sheet or plate. Individual lenses 12 can also be configured as separate pieces and attached to the substrate for form the lens array.

The shape of individual lenses 12 is also not limited to a cylindrical configuration and can also include round, elliptical, hexagonal, square or rectangular shapes in either linear-focus or point-focus configurations. Lenses 12 can also be packed with any desired density covering the entrance aperture of lens array 4. While it is preferred that, when lenses 12 have a point-focus configuration, they are arranged in equally spaced rows and columns, the placement of lenses 12 in lens array 4 can be according to any suitable spatial metric and by any desired means. For example, lenses 12 can be spaced apart, contacting each other or overlapping and can be positioned in any desired pattern in the array.

Figure 2:
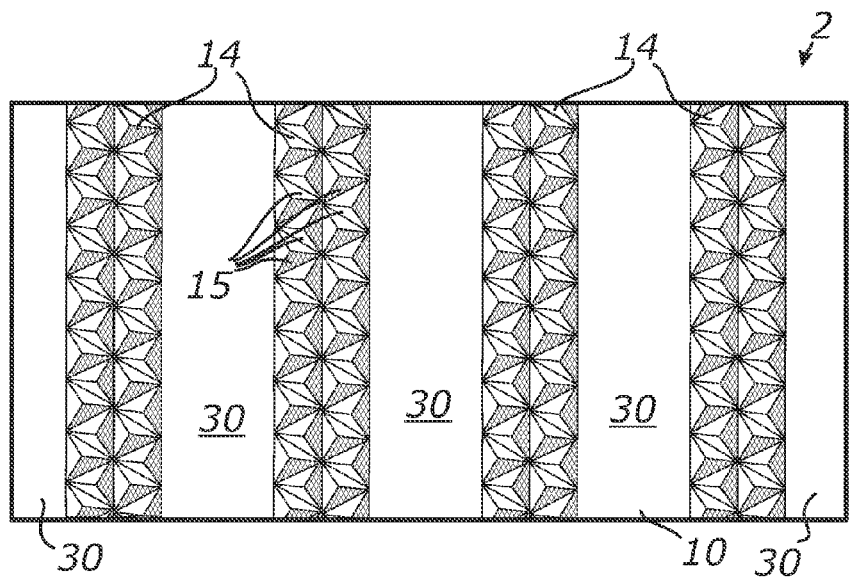
FIG. 2 is a schematic view of a retroreflective lenticular system portion showing an arrangement of retroreflective components, according to at least one embodiment of the present invention.
Figure 3:
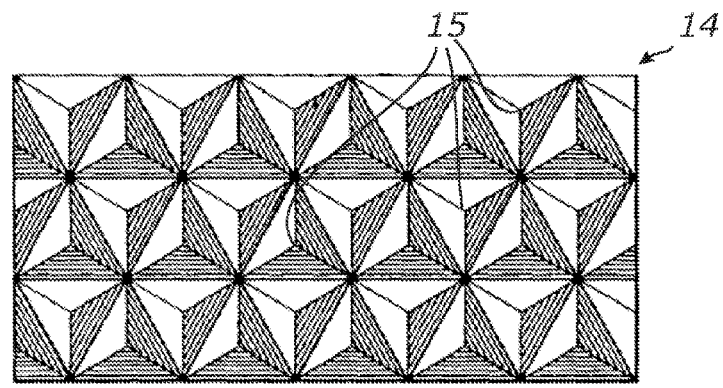
FIG. 3 is a schematic of a retroreflective area comprising retroreflecting microstructures, according to at least one embodiment of the present invention.

FIG. 2 depicts a portion of system 2 showing four strips of retroreflective areas 14 formed in surface 10 and interlaced with the strips of separation areas 30, where each retroreflective areas 14 includes a plurality of cube-corner prismatic retroreflectors 15. Retroreflectors 15 can be shaped in a manner similar to conventional cube-corner prismatic retroreflectors such as, for example, those found in various traffic applications and particularly road signs. In each retroreflector 15, the angle formed by the intersection of two cube faces (the dihedral angle) is around 90 degrees so as to allow the incident light to be redirected back to the source. FIG. 3 shows an en exemplary layout of a portion of retroreflective area 14 comprising retroreflective cube-corner prismatic structures of retroreflectors 15.

It should be understood that the size or shape of the faces of the cube corner prism elements, or the dihedral angles, or the flatness of the faces or the flatness of the front surface, can all be modified to change the pattern of retroreflection and thereby determine the regions around the light source in which the retroreflector 15 is visible. In an example related to the traffic applications, the dihedral angle can be slightly modified so that the incidental light coming from an automobile headlight is retroreflected into a cone of light which encompasses the driver's eyes.

Figure 4:
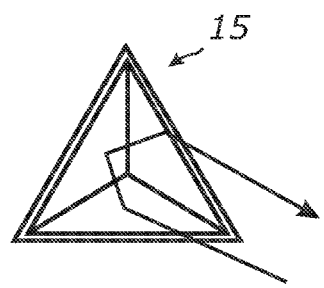
FIG. 4 is a schematic view and ray tracing of an individual retroreflective structure comprising a cube-corner element according to at least one embodiment of the present invention.

FIG. 4 illustrates the principle of light reflection by retroreflector 15 represented by a cube-corner prism. The incident ray entering the aperture of retroreflector 15 at an arbitrary angle within the designed angular range is reflected from the reflective sides of the prism and directed generally back toward the source.

Figure 5:
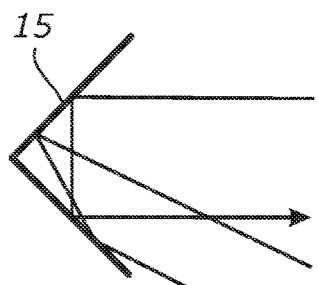
FIG. 5 is a schematic view, in a cross-section, and ray tracing of an individual retroreflective structure comprising a cube-corner element, according to at least one embodiment of the present invention.

In FIG. 5, illustrating a cross-section of retroreflector 15 in a cube-corner or linear prismatic configuration, two rays entering at different angles the retroreflector aperture are reflected back towards the source. The reflective faces of retroreflectors 15 can be configured to reflect by means of a Total Internal Reflection (TIR). Alternatively, the retroreflector surfaces may be metalized to accept light from a greater angular range. The angle between the reflective facets should preferably be about 90°. However, other than the right-angle configurations of retroreflectors can also be used.

Retroreflectors 15 may be formed in rear surface 10 using a variety of conventional means. For example, when lens array 4 is molded from a transparent plastic material, retroreflectors 15 can be formed at the time of making the lens array in a single molding process. For this purpose, a two-sided mold can be provided having a negative replica of lens structures on one side and a negative replica of retroreflectors 15 on the other side. Similarly, when lens array 4 is made by conventional embossing using two cylinders, one of the cylinders can be engraved with a negative replica of the lens array pattern and the other cylinder can be engraved with a negative replica of the array or respective retroreflective patterns thus producing the suitable double-sided surface relief structures of system 2. In a further example, retroreflectors 15 can be made separately from lens array 4 by embossing the retroreflective patterns into a film of transparent material which can then be attached to the back of the lens array using optical adhesive. In a yet further example, the suitable pattern of retroreflectors 15 can be formed by coating and curing a UV curable resin on surface 10 or on a substrate film using a master mold.

Figure 6:
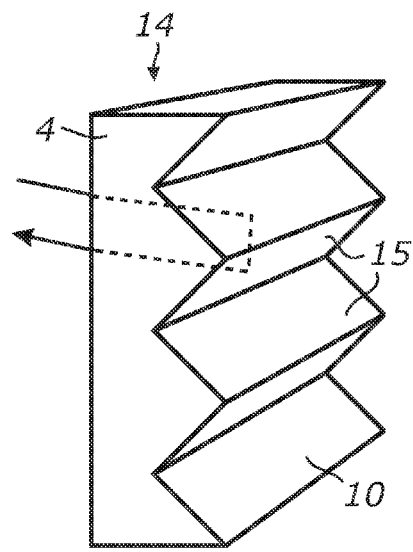
FIG. 6 is a schematic perspective view of a retroreflective area portion showing linear prismatic retroreflectors, according to at least one embodiment of the present invention.

The prismatic structures of retroreflectors 15 can also have a linear configuration, in the form of a linear prism array, which can be formed by one or more right-angle prisms which provide retroreflection in at least one angular dimension. A portion of such retroreflective area 14 is illustrated in FIG. 6 in which an array of prismatic retroreflectors 15 is formed by a series of adjacent 90-degree V-grooves in surface 10 of lens array 4.

When lens array 4 is formed by linear cylindrical lenses 8 and retroreflectors 15 are formed by linear prisms, the prisms can be oriented with respect to lenses 8 at any suitable angle from 0° to 90°, depending on the intended application of system 2. By way of example and not limitation, when a light source and/or observer are expected to be moving mostly in a plane perpendicular to lenses 8, it may be preferred that the prisms extend parallel to lenses 8. In another non-limiting example, when lenses 8 extend generally parallel to the plane of the intended light source/observer motion, the retroreflective linear prisms may also be positioned perpendicular to lenses 8.

Figure 7:
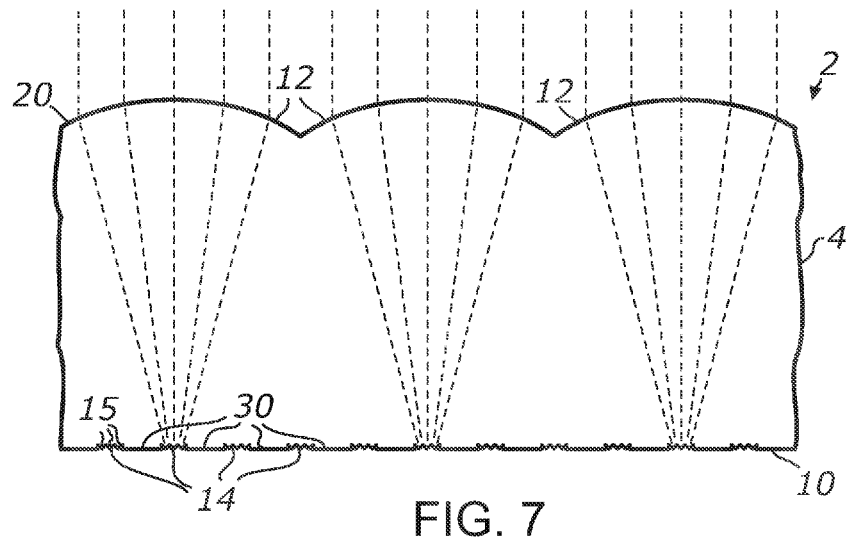
FIG. 7 is a schematic cross-sectional view and raytracing of a retroreflective lenticular system portion showing lenses focusing incident light onto retroreflective areas, according to at least one embodiment of the present invention.
Figure 8:
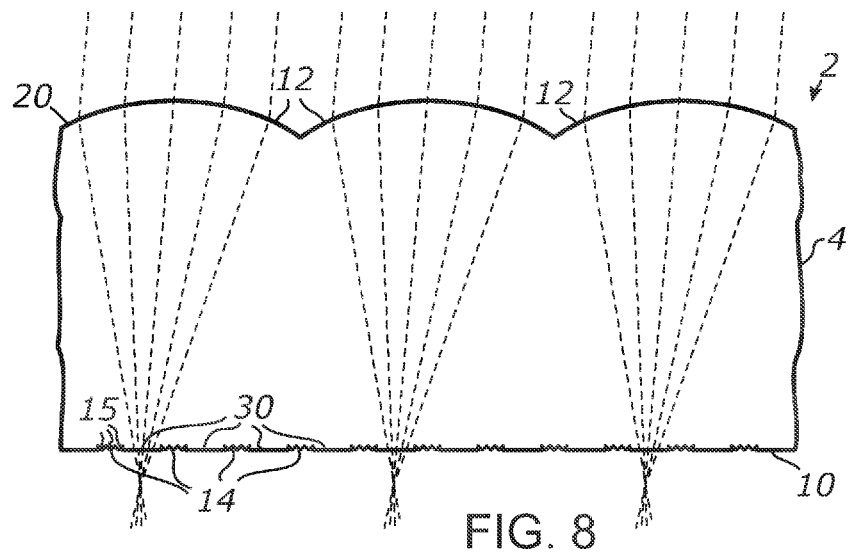
FIG. 8 is a schematic cross-sectional view and raytracing of a retroreflective lenticular system portion showing lenses focusing incident light onto separation areas, according to at least one embodiment of the present invention.

The operation of retroreflective lenticular system 2 is further illustrated in FIG. 7 and FIG. 8. Referring to FIG. 7, incident light from a distant source (not shown) enters front surface 20 of lens array 4 and is focused by respective lenses 12 onto a plurality of focal areas at the opposite rear surface 10 of the array. The incident light is exemplified by several parallel rays all of which are perpendicular to the frontal surface of lens array 4. However, it should be understood that the same principles can be applied to any number of rays or, generally, to any beam of light emanated by a light source and illuminating the front surface 20 of lens array 4. Furthermore, a parallel incident beam, which is also perpendicular to the plane of lens array 4, is illustrated for the sake of clarity and for better illustration of the this invention. However, the principles being described can also be applied to the cases of a quasi-parallel beam, divergent, convergent or otherwise non-parallel beam or multiple beams entering the front surface 20 of lens array 4 from any suitable direction or at any incidence angle from 0° to 90° with respect to a surface normal.

Each of lenses 12 focuses the incident rays onto at least one retroreflective area 14 so that essentially all of the rays are intercepted by at least a portion of retroreflectors 15 formed in surface 10. For providing a more distinct visual effect of change in the apparent brightness of system 2, it is preferred that, when at least some of retroreflective areas 14 are illuminated, substantially all or at least a substantial part of the focused light is steered away from separation areas 30 so that only the retroreflective areas receive the focused light. It will be appreciated by those skilled in the art that, due to the retroreflective properties of retroreflectors 15, all these rays will reflect back toward the respective lenses 12 and will be further collimated by the lenses generally toward the light source direction.

Obviously, most retroreflectors translate light across their aperture as a part of the retroreflective process. Since retroreflectors 15 have a finite size and each ray generally exits from a different place of the retroreflector aperture than the place or ray entry, the retroreflected ray will also strike a slightly different area of the lens compared to the incident ray. As a result, the light beam retroreflected by system 2 back toward the light source may not precisely follow the incident light path and may have somewhat greater divergence compared to the original beam emanated by the light source. However, when the size of retroreflectors 15 is sufficiently small ensuring the light translation in the focal plane is also small and the respective light divergence is minimal. Particularly, the transversal size of each reflector can be made comparable to or smaller than the transversal size (or width) of each of the focal lines of the respective lenses 12. It will be understood that a small light translation across retroreflector 15 within the focal area of the lens will not appreciably change the path of the retroreflected light and, therefore, will not substantially affect the light collimation by the respective lens. Thus, in the illustrated case, when at least a substantial part of retroreflective areas 14 is illuminated with focused light, the retroreflected beam will be substantially collimated and generally directed back towards the light source, thus substantially enhancing the apparent brightness of system 2.

Referring now to FIG. 8, light enters front surface 20 of lens array 4 at a different incidence angle causing the focused beams to shift from retroreflective areas 14 to the adjacent separation areas 30. Such change of the incidence angle can be illustrative, for example, of a moving vehicle illuminating a road sign with its headlamps, or, alternatively, changing a position or angle of a display or signal device with respect a stationary light source. Lenses 12 continue to focus the incident light onto back surface 20 of lens array 4. However due to the chance in the incidence angle, at least a substantial portion of the light is now focused onto separation areas 30 located between retroreflective areas 14. By way of example and not limitation, separation areas 30 can be merely the spaces between retroreflective areas 14 and may comprise smooth surface portions of rear surface 10. Since lens array 4 is made of a transparent material, light rays may simply pass through these spaces and exit from the back side of lens array. Thus, in the lens array orientation with respect to the incident beam illustrated in FIG. 8, practically no light will return toward the light source, so that system 2 will appear dark or at least appear in a much lower apparent brightness compared to the case illustrated in FIG. 7. In order to reduce the stray light exiting system 2 when light strikes separation areas 30, separation areas can be made opaque or a layer of opaque material may instead be provided on the back of lens array 4 in order to absorb rays falling into the gaps between retroreflective areas 14.

According to at least some embodiments, as the viewing angle and the illumination angle are changing synchronously, as exemplified by the case of a moving car or truck which also illuminates system 2 with its headlamps, the retroreflective areas 14 and the separation areas 30 can be illuminated one after another in a rapid succession. As a result, the apparent brightness of system 2 will also be changing in the same succession thus providing a flashing effect and enhanced system visibility. Accordingly, the either the entire area of system 2 or at least one or more of its portions can be configured to provide dynamic visual effects by the appropriate sizing and ordering the retroreflective areas 14 and separation areas 30 with respect to the array of lenses 12.

According to at least some embodiments, system 2 is configured to include at least one variable brightness region in which lens array 4 comprises a plurality of identical cylindrical lenses extending parallel to each other. The variable brightness region further comprises a plurality of retroreflective areas 14 configured as a repetitive pastern of periodic strips extending parallel to the longitudinal axes of lenses 12 and distributed across the focal plane lens array 4. The spacing strips between retroreflective areas 14 form separation areas 30. Each pair of strips formed by an individual retroreflective area 14 and an adjacent separation area 30 is configured to have a predefined combined width being substantially smaller than the transversal aperture, or width, of each lens 12. Furthermore, the pitch of lenses 12 in lens array 4 is selected to be a multiple of the pitch or period of either retroreflective areas 14 or separation areas 30. In other words, the plurality of pairs of retroreflective areas 14 and separation areas 30 may form a periodic pattern with a period or pitch B being approximately equal to A/n, where A is the period or pitch of lenses 12 and n is an integer multiplier.

According to the preferred embodiments of the present invention, multiplier n is greater than 1. In accordance with at least some embodiments of the present invention, it may be preferred that multiplier n is at least 4 and, even more preferably, is equal to at least 10 or a greater integer number. It will be appreciated that, when system 2 is designed to display flashing or flip effects, the spacing period can effectively control the flashing frequency at a given rate of viewing angle change, while the proportion between the width of the retroreflective areas 14 and separation areas 30 can control the relative duration of the flashes. Therefore, when it is desired that system 2 is more responsive to the change of the angular position of the light source or when it is desired to display a greater number of flashes or flip effects for a given angular range, the multiplier n can be increased accordingly, up to the maximum resolution that lenses 12 can handle.

By way of example and not limitation, a lenticular lens sheet having a lens density of 10 lpi (lenses per inch) can be coupled to a dynamic effect region having a density of retroreflective strips of 100 lpi, in which case multiplier n will be equal to 10. Furthermore, by applying a higher quality fabrication process for lenses 12, the density of retroreflective areas 14 may be further increased up to 400 lpi or more (n=40 or more).

Retroreflective areas 14 can have the same width as separation area 30 or the relative widths can be arranged in any other suitable proportion. In a non-limiting example, the width of each retroreflective area 14 can be made about 25% of the separation area width. In this case, the respective portion of system 2 can be configured to flash at least several times in the lights of an approaching vehicle, where the relatively brief periods of flashes will alternate with approximately four-times longer "dark" periods between the flashes.

It should be understood that different groups of alternating retroreflective areas 14 and separation areas 30 can be formed and that the patterns of respective areas can be configured differently for each groups. This can be useful, for example, for displaying various outlines, patterns and images in variable brightness. Furthermore, two or more different patterns or image frames can be encoded with the alternating retroreflective areas 14 and separation areas 30 by means of interlacing. For example, interlacing can be done by an analogy of interlacing multiple black-and-white images in lenticular printing, where the retroreflective areas 14 can be analogous to the white-color pixels and the separation areas 30 can be analogous to the black-color pixels of the lenticular print, or vice versa.

Accordingly, when system 2 is configured to display alternating image content comprising multiple images or frames, a sequence of retroreflective areas 14 and separation areas 30 can be grouped together in accordance with the unique interlaced sequence corresponding to the respective "pixel" location in the encoded source images, in contrast to grouping of said areas strictly pairwise and on line-by-line basis for a simple flashing or flip visual effect. Since encoding multiple images or frames generally requires a greater number of interlaced lines of retroreflective areas 14 and separation areas 30, it may reduce the number of times that system 2 can display the complete image sequence for a given range of illumination/viewing angles. Nevertheless, it allows for displaying more complex dynamic visual effects such as multi-frame flip, animation, 3D, morph and zoom which may not be possible with a simple periodic line-by-line sequencing of retroreflective and separation areas.

Figure 9:
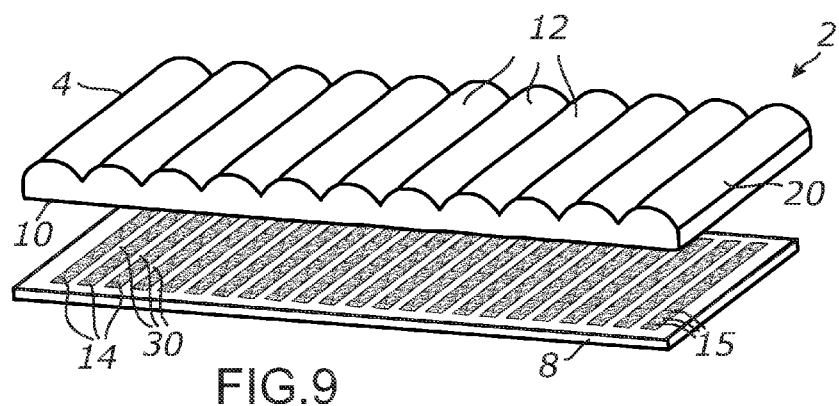
FIG. 9 is a schematic perspective view of a retroreflective lenticular system showing a retroreflective patterned film, according to at least one embodiment of the present invention.

FIG. 9 shows an embodiment of retroreflective lenticular system 2 comprising lenticular lens array 4 and a micropatterned retroreflective film 8 disposed at a distance from lens array 4 on the lens array's back side. Retroreflective film 8 comprises a pattern of retroreflective areas 14 alternating with separation areas 30. Each retroreflective area 14 includes an array of reflectors 15 configured to receive light from lenses 12 of lens array 4 and retroreflect said light back to lenses 12 generally at the same angle as the angle of incidence. Retroreflectors 15 can be formed by microstructuring the surface of film 8 facing lens array 4, in which case it may be advantageous to configure retroreflectors 15 as mirrored cube-corners reflecting by means of a specular reflection. Alternatively, retroreflectors 15 can be formed in the opposing surface of film 8 and configured to retroreflect by means of TIR. In the latter case, the reflective surfaces of retroreflectors 15 may also be optionally mirrored, for example, to improve reflection efficiency at larger incidence angles.

Figure 10:
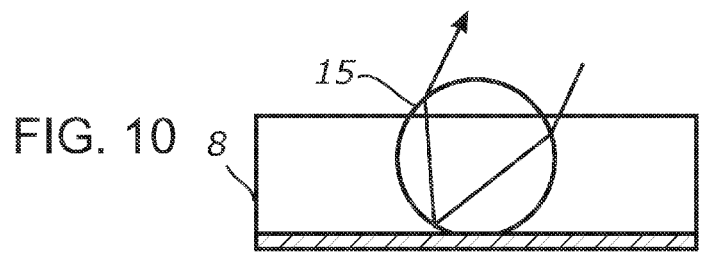
FIG. 10 is a schematic view, in a cross-section, and ray tracing of an individual retroreflective structure comprising a microsphere, according to at least one embodiment of the present invention.

Retroreflectors 15 of retroreflective film 8 can be formed by any suitable retroreflective structures such as, for example, those found in various traffic applications and particularly road signs. Retroreflectors 15 can be also of any other known type including, for example, optically transparent microspheres, beads or linear prisms to retroreflect incident light. FIG. 10 shows an example of light ray reflection by retroreflective structure 15 formed by a microsphere or bead made from glass or high-refractive-index ceramic material and embedded in the material of retroreflective film 8. The light ray entering the bead undergoes reflection from the back of the bead and exits, with refraction, back toward the source.

Referring back to FIG. 9, retroreflective film 8 is disposed at an effective focal distance from lenses 12 so that each lens 12 is capable of focusing a quasi-parallel beam of light onto the surface of film 8. Each retroreflective area 14 has a width substantially smaller than the aperture of the lenses in the lens array. Furthermore, the transversal aperture of each retroreflectors 15, in a plane perpendicular to the longitudinal axis of lens array 4, is selected not to be exceeding the width of the focal line of each lens 12. Each separation area 30 may also have the width that is substantially smaller than the aperture of the individual lenses making the lens array. Accordingly, the spacing between individual retroreflective areas 14 and can be so selected as to result in lens array 4 focusing the incident light either onto only retroreflective areas 14 or only onto separation areas 30, depending on the angle of incidence, thus forming a structure of system 2 that can rapidly change its apparent brightness solely based on the change in the viewing and illumination angle.

The embodiment of FIG. 9 is not limited to the case when retroreflective film 8 is separated from the body of lens array 4 by a considerable space or a layer of air, but can also be applied to the case when retroreflective film 8 is separated only by a thin buffer layer of transparent material or by multiple light-transmissive layers. By way of example, the types of the layers may include but are not limited to color filters, masks, spacing films, diffusers, prism arrays, light directing films, brightness enhancement films, and the like. Lenses 12 can be configured accordingly to accommodate such layers and still have an effective focal distance approximating the distance from the lens vertices to the retroreflective surface of film 8. Furthermore, retroreflective film 8 can be attached directly to the back surface of lens array 4 without any buffer layer or using a thin optical adhesive layer to promote the adhesion of the film to the lens array. Intermediate layers may also include interlaced lenticular image masks including transparent areas or strips alternating with dark or light-blocking areas in order to selectively transmit incident light toward retroreflective film 8 and create various dynamic visual effects.

Figure 11:
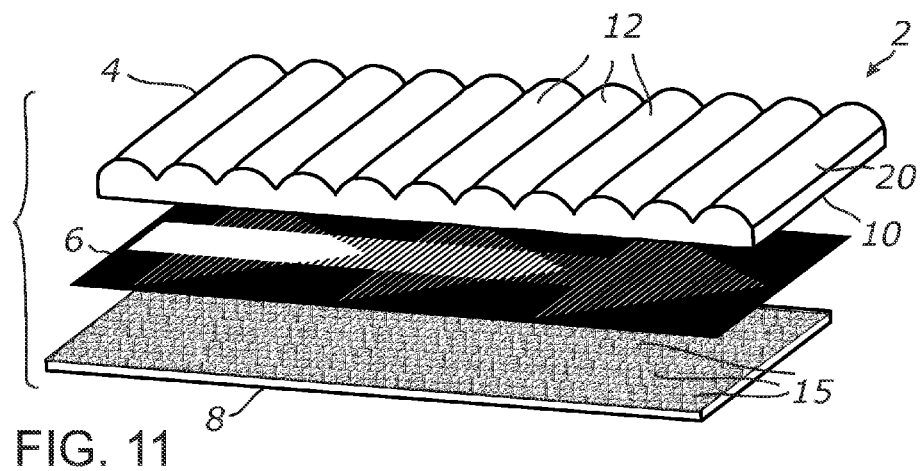
FIG. 11 is a schematic exploded perspective view of a retroreflective lenticular system, showing an interlaced lenticular image mask disposed between a lens array and a retroreflective film, according to at least one embodiment of the present invention.

FIG. 11 illustrates an embodiment of retroreflective lenticular system 2 comprising a planar sandwich-like layered structure including an external optical layer exemplified by optically transparent lenticular lens array 4, a masking layer exemplified by an interlaced mask 6, and a retroreflective layer exemplified by retroreflective film 8 comprising a densely-packed array of embedded retroreflective microstructures 15.

Accordingly, in the embodiment shown in FIG. 11, lens array 4 and retroreflective film 8 represent opposing external layers of system 2 wherein interlaced mask 6 is sandwiched between said layers so system 2 has a thin monolithic structure. It should be understood that system 2 may optionally have any number of additional layers which are not shown in FIG. 11 and which are not essential for discussing the basic structure and operation of the present invention. In an illustrative example, the optical layer may optionally have an antireflective coating/anti-scratch coating, UV-inhibiting coating and the like. Various internal layers may be provided between lens array 4 and retroreflective film 8. In a further example, retroreflective film 8 can, may optionally employ an external protective layer or backsheet that will protect it from the environment or it may also have a multilayer structure. The respective layers of system 2 can be laminated together using heat treatment or they may also be glued together using an optically transparent adhesive.

Lens array 4 comprises a plurality of parallel cylindrical lenses 12 on the front face 20 and has a flat, smooth surface on the back. Lens array 4 may represent any of the lens array structures described above and is preferably configured to have a focal plane at or slightly below its rear surface 10.

Interlaced mask 6 comprises a plurality of alternating areas having different optical properties. According to at least some embodiments of the present invention, the different optical properties may include different transparency or opacity levels, different colors, polarization, reflectivity, refractivity, scattering, diffusing, diffraction, light bending capability or any other substantial differences in the way the respective areas transform or direct the incident light. The desired differences in optical properties of the alternating areas of mask 6 may be achieved by a variety of means including but not limited to employing different material compositions, structure, texturing, surface or material treatment, etc.

According to a preferred embodiment, mask 6 may include opaque areas alternating with window areas or opening between the opaque areas. It will be appreciated that superimposing of such interlaced mask 6 onto retroreflective film 8 will expose the unmasked retroreflective areas of film 8 to the incident light and viewing while blocking the other retroreflective areas to the incident light. Therefore, in some embodiments, retroreflective areas 14 may be formed by the combination of the window areas or openings in mask 6 and the retroreflective background of film 6. Accordingly, separation areas 30 may be formed by the respective opaque areas of the mask.

Retroreflective structures 15 of retroreflective film 8 are preferably formed by cube-corner prismatic retroreflectors such as, for example, those found in various traffic applications and particularly road signs. Retroreflective film 8 may be provided with an adhesive backing and attached to a substrate before being incorporated into the layered structure of system 2. There is a variety of finished commercial products available from different manufacturers that can be suitable for the use for retroreflective film 8. By way of example and not limitation, these include 4000 $DG^3$ and VIP series reflective sheeting from 3M, Super Engineering Grade 17000 and 18000 or Crystal Grade 93000 series from Nippon Carbide, T-9500 series from Avery Dennison and the like.

Retroreflective film 8 may have no particular color or it may be suitably colored to enhance the visibility. A representative selection of colors suitable, for example, for road sign or signaling applications of system 2 includes but is not limited to: white, orange, yellow, red, blue, green, and brown. Alternatively, a desired color can be provided through providing a color filter film positioned between lens array 4 and retroreflective film 8. In a further alternative, interlaced mask 6 can be formed on a sheet of transparent material and coloring can be provided on that sheet.

Interlaced mask 6 may be formed by depositing a specially patterned opaque layer on the smooth surface 10 of lens array 4. Mask 6 may represent alternating lenticular opaque and transparent areas formed by means of interlacing two, three, four or more inverted images or brightness levels that need to be displayed in succession depending on the angle of view and illumination. The technique of interlacing is common to the fields of lenticular printing and lenticular screens that provide various visual effects such as flip, animation, morph, 3D or zoom.

In accordance with a preferred embodiment of this invention, when system 2 is configured for displaying alternating image content, a suitable lenticular interlacing technique may be applied to an inverted silhouette of the intended image or images as illustrated, by example, below.

FIG. 12A through FIG. 13 illustrate the principle of forming interlaced mask 6 in more detail.

FIG. 12A, FIG. 12B and FIG. 12C show three different bitonal (black and white) images of a white arrow located at different positions in relation to the black background which may have approximately the same size as lens array 4. Black color corresponds to a darker area of the image and the white color corresponds to a brighter, retroreflective area of the image. It will be apparent to those skilled in the art of lenticular images or animation that displaying the images, or image frames, shown in FIG. 12A, FIG. 12B, and FIG. 12C in a succession may create an animated effect of a bright arrow moving to the right across a dark background.

FIG. 13 shows an interlaced image encoding the content of the above three images in a single image. It will be appreciated that an interlaced mask carrying such an image can be viewed through lenticular lens array 4 having a suitable lens pitch and display only one of the three images at a time depending on the viewing angle. For a moving observer, the images will be displayed in succession providing an animated visual effect. The enhanced, variable brightness visual effects can be produced by providing the retroreflective background of film 8 on the back of mask 6 which retroreflects the portions of incident light which enter onto film 8 through the window areas of interlaced mask 6.

Accordingly, interlaced mask 6 can be formed based on the pattern of the interlaced image shown in FIG. 13, where the black area of the image corresponds to a layer of opaque material of mask 6 to prevent the incident light from passing through said mask and the white area of the image corresponds to a window area or opening in the opaque material to provide for the optical transparency and for the light to pass through the mask 6. In other words, when a flip or animation effect of a bright symbol, outline, pattern or any other image content on a darker background is required, the corresponding mask 6 can be made as a negative of the target image content, as described above and illustrated in FIG. 12A through FIG. 13.

When lenses 12 of lens array 4 have a cylindrical configuration, mask 6 should be positioned with the lenticular features extending parallel to the longitudinal axes of the lenses so that retroreflective areas 14 can alternate with separation areas 30 along a direction generally perpendicular to said longitudinal axes. Accordingly, referring to foregoing examples described upon the case when areas 14 and 30 are interlaced by providing gaps between series of retroreflectors 15, the interlaced pattern of mask 6 may similarly be configured so that the opaque areas and/or spaces between them are sized in a predetermined relationship with respect to the pitch of lenses 12. Particularly, the pitch of lenses 12 can be an exact or approximate multiple of the width of each interlaced sequence of retroreflective and separation areas representing a one or more pixels in single set of frames. In an example illustrating some of the simplest cases where mask 6 comprises parallel periodic strips of opaque areas, the lens pitch may be selected to approximate a multiple of the pitch or period of said strips.

FIG. 14 shows an exemplary embodiment of retroreflective lenticular system 2 that is generally the same as that shown in FIG. 11 except that interlaced mask 6 is configured for displaying a flashing image of an arrow rather than an animated sequence of a moving arrow. Mask 6 represents a generally opaque layer with lenticular gaps corresponding to a pattern obtained by interlacing images 92 and 94 shown in FIG. 15. Accordingly, retroreflective areas 14 of system 2 are represented by the open portions or windows in retroreflective film 8 while separation areas 30 are represented by the opaque areas of mask 6. Interlaced mask 6 should be accurately aligned relatively to lens array 4 so that the lenticular features of mask 6 are extending essentially parallel to the longitudinal axis of each linear lens in the lens array.

Referring further to FIG. 14 and FIG. 15, it will be appreciated by those skilled in the art that, with the proper selection of the pitch of lenses 12, the width of the opaque areas and the openings between them in mask 6, system 2 will provide a flashing effect of a bright arrow 96 on a dark background to an observer moving perpendicular to the lenticular lenses 12, provided that there is a suitable light source disposed in a proximity of the observer's line of view.

A preferred method of forming and depositing interlaced mask 6 onto surface 10 of lens array 4 is through printing with opaque inks or paint with good adhesive properties directly onto said surface by an offset or digital printer. The spaces between opaque areas will provide the window areas through which light can enter onto retroreflective film 8 and return back to lenses 12 thus providing system 2 retroreflectivity at a plurality of discrete angles.

Alternatively, mask 6 can be formed by printing the pattern of FIG. 13 on a transparent plastic film which can then be laminated to surface 10. In this case, the window areas will be formed by the respective openings between the opaque ink areas. In a further alternative, mask 6 can also be fabricated from an opaque plastic film, sheet metal or the like by cutting out the designated pattern, for example, by using a sharp object, a laser, a stamping press, etc, and then laminated between lens array 4 and reflective film 8. In a yet further alternative, mask 6 can be printed directly on the front surface of retroreflective film 8, which will also form transmissive window areas alternating with opaque areas. The print can be made using an offset printer, digital printer or any other suitable means. It is preferred that mask 6 is thin enough in order not to add significant space between lens array 4 and retroreflective film 8 as well as not to impair the operation of system 2 as it will be apparent from the details disclosed below.

FIG. 16 and FIG. 17 illustrate the operation of system 2 shown in FIG. 11. Each lens 12 of lens array 4 may be configured to have the effective focal distance approximating the thickness of the lens array. More particularly, it may be preferred that each lens 12 is configured to focus the incident light at an area slightly below rear surface 10 of so that lens array 4 can be characterized by a focal plane 16 disposed just outside of the lens array and in a close proximity to its rear surface.

Referring to FIG. 16, rays 32 and 34 emanated, for example, by headlamps of a distant car and incident onto the entrance aperture of system 2 at a near-normal angle with respect to the surface of lens array 4 strike one of the lenses 12. Lens 12 directs (focuses) the rays onto the opaque material of interlaced mask 6. More particularly, both rays 32 and 34 are focused onto one of the separation areas 30 disposed between two adjacent retroreflective areas 14. Depending on the mask material, rays 32 and 34 can be partially or completely absorbed or they can be scattered/reflected into all directions. Thus, the respective lens will appear dark or at least in a reduced brightness to the car driver.

Referring now to FIG. 17, as the car approaches system 2 and the angular position of the light source and the observer changes, the illumination of system 2 occurs at an angle 42 with respect to a surface normal 44, as illustrated by light rays 36 and 38. As a matter of optics, the respective lens 12 receiving rays 36 and 38 focuses them onto a different area, in this case being one of the retroreflective areas 14 formed by an opening in the alternating pattern of interlaced mask 6 and by the respective portion of retroreflective film 8 below the mask. Since both rays now strike reflective film 8 underneath the interlaced mask, both of them are retroreflected by retroreflectors 15 and directed back toward lens 12 at about the same angles. Lens 12 collimates rays 36 and 38 and directs them back towards the source.

For the proper operation of this embodiment, it is essential that retroreflective structures 15 of film 8 are sufficiently small compared to the transversal size of each lens 12, in which case the focused light rays can be properly retroreflected without leaving the focal area of the respective lens. Since the retroreflected rays are emitted from the focal area of lens 12, the lens act as a collimator causing said rays to generally follow the original incidence direction. System 2 can be designed so that the light is collimated within a narrow angular cone which includes the driver's eye. This will cause the respective lens 12 to appear bright to the driver. Accordingly, other lenses 12 illuminating the respective portions of system 2 will also appear bright thus increasing the overall apparent brightness of system 2 or at least its portions configured for retroreflection at the given angle.

For an ideal operation of system 2, it may be preferred that the both interlaced mask 6 and retroreflective film 8 are substantially thinner than lens array 4 and are also thin enough so that the focal area formed by each individual lens 12 encompasses the three-dimensional area where the rays focused by said lens interact with the mask material and retroreflectors 15 of the underlying film 8. It is also preferred that the transversal aperture of each retroreflector 15 in a plane perpendicular to the lens longitudinal axis does not exceed the focal line width of the respective lens 12. This will allow lenses 12 to more efficiently collimate the retroreflected rays so that said rays can more accurately follow their original incidence path.

As the car keeps moving causing angle 42 to constantly change and lens array 4 to alternately focus the headlamps beam on different portions of mask 6 in accordance with the mask's interlaced pattern, the driver will observe the intended dynamic visual effects and repetitive change in the apparent brightness of at least the designated portions of system 2. Thus, the visibility of the road sign exemplifying system 2 can be enhanced by the dynamic visual effects without any additional illumination source besides the headlamps of the approaching vehicle.

The operation of at least some embodiments of the present invention is further illustrated in FIG. 18. FIG. 18 depicts a car 50 approaching a road sign that incorporates system 2. Car 50 illuminates the front surface of system 2 by its headlights 28 at angle 42 with respect to normal 44. System 2 receives beams of light 62 and 64 from the left and right headlamps, respectively, and retroreflects each of the beams back towards the car with the visual information encoded by interlaced mask 6 (not shown in FIG. 18) and within a narrow cone including an area 52 where the car driver is located. As car 50 further moves down a road 86, its driver will observe flashing effects or alternating image content in variable brightness, depending on the visual information encoded in system 2, as explained in the above examples.

It should be understood that, while at least some of foregoing embodiments have been described upon the case where mask 6 comprises an opaque layer interlaced with lenticular gaps for simplicity, the present invention is not limited to this and can be applied to the case where mask 6 comprises interlaced areas of various optical density and/or various colors so as to provide the intended visual effects for multiple gray scale or color image contents.

System 2 is not limited to configurations where retroreflective areas 14 are completely isolated from each other but may also include interlaced arrangements where at least some retroreflective areas 14 are contacting or overlapping with adjacent retroreflective areas. Furthermore, retroreflective areas 14 may be arranged in various patterns or lines having constant or variable transversal width and extending over considerable lengths. Similarly, separation areas 30 may also be configured contacting each other, overlapping or otherwise extending over substantial areas.

While at least some of foregoing embodiments have been described upon the case where lens array 4 has a linear configuration and comprises cylindrical lenses 12, this invention is not limited to this and can be applied to the case where lens array 4 comprises point-focus lenses or other focusing and/or collimating optical structures.

FIG. 19 depicts a variation of lens array 4 which comprises point-focus lenses 12 arranged in a rectangular configuration having a high packing factor. Each of such lenses 12 can focus the incident light in two dimensions and can thus be configured to have a substantially smaller focal area than the cylindrical lenses.

FIG. 20 shows an alternative configuration of point-focus lens array 4 in which lenses 12 have hexagonal shapes and also allow for obtaining a high packing density and fairly small focal areas. Since the smaller focal areas of point-focus lenses 12 allow for shrinking the illuminated area in two, system 2 employing point-focus lens array 4 may be configured to encode more different image frames or provide a generally greater variety of dynamic visual effects. Particularly, system 2 may be configured to be responsive to the change of the viewing/illumination angle in both angular dimensions.

Similarly, the arrangements of retroreflective areas 14 and separation areas 30 are also not limited to linear patterns and may include various two-dimensional patterns, including but not limited to square, hexagonal, concentric, staggered, and any suitable ordered or random patterns.

FIG. 21 illustrates a portion of the pattern formed by alternating retroreflective areas 14 and separation areas 30. Dark areas corresponding to separation areas 30 may be formed by an opaque layer on the transparent substrate of the mask. Accordingly, retroreflective areas 14, represented by white dots in FIG. 21, may be formed by the combination of the openings in opaque areas and the underlying layer of retroreflective film 8 (not shown in FIG. 21). A path 78 illustrates an exemplary path of the illuminated area produced by the respective point-focus lens 12 (also not shown in FIG. 21)

when lens array 4 is illuminated by a moving distant light source. Path 78 spans across multiple retroreflective areas 14 and separation areas 30. Therefore, the aperture of the respective lens 12 will appear bright in a retroreflective phase, when the lens illuminates at least a part of an individual retroreflective area 14, and dark in a light suppression phase, when the lens illuminates separation area 30, which process may repeat at least several times in succession.

The apertures of respective individual areas 14 and 30 can be selected to provide various durations of retroreflection phases or light suppression phases. Furthermore, it is preferred that at least some parts of system 2 are configured so that at least a substantial part of lenses 12 in these areas illuminate either a plurality of retroreflective areas 14 or a plurality of separation areas 30 at a time thus uniformly increasing or decreasing the apparent brightness of said areas.

FIG. 22 shows an alternative pattern of mask 6 which represents an inverted pattern of FIG. 21. In FIG. 22, opaque areas represented by black dots are printed on a transparent substrate of mask 6 and form separation areas 30 that alternate with retroreflective areas 14 represented by a white background. Similarly, the illumination area of the focused light follows path 78 and causes a dynamic change in apparent brightness of the lens illuminating the illustrated portion of mask 6.

FIG. 23 depicts another example of the two-dimensional pattern of alternating retroreflective areas 14 and separation areas 30, which have identical sizes and intermit with each other in a "checkerboard" arrangement.

In FIG. 24, showing a yet another example of alternating pattern of areas 14 and 30, the separation areas 30 are formed by a lattice of horizontal and vertical lines and retroreflective areas 14 are formed by the areas of underlying retroreflective layer exposed through the respective window areas or openings between the opaque lines.

While various patterns have been illustrated for interlaced mask 6, it should be understood that these or similar patterns may also be formed by microstructuring the respective surfaces of the embodiments illustrated in FIG. 1 and FIG. 9 without providing a separate masking layer.

There is also a great degree of flexibility as to what content can be visualized using system 2. The interlaced retroreflective areas 14 and separation areas 30 may be configured to display, in succession, various flashing shapes, symbols, text, colors, and any other desired image content including that designed in an animated sequence, flip, morph, 3D, or zoom.

At least some of the foregoing embodiments have been described upon the case where interlaced mask 6 comprises a plurality of alternating areas having different transparency levels, such as one type of the area being substantially transparent and the other type being opaque. However, the present invention is not limited to this and can be applied to the case where other differences in optical properties can be utilized for forming the respective alternating areas of mask 6.

According to an alternative embodiment, interlaced mask 6 may comprise alternating areas having two or more different colors and forming a color mask rather than an opaque mask. Referring to the structure of system 2 depicted in FIG. 11 and FIG. 17, the color mask can be made substantially transmissive to the incident light across all its alternating areas and allow for an unimpeded passage of light from lenses 12 to retroreflectors 15 of film 8 and back from retroreflectors 15 to lenses 12. At least some of the alternating areas 14 and/or 30 can be provided with light filtering capabilities so as to communicate a particular color to the light passing through them.

In operation, as the incident light focused by lenses 12 sweeps across the alternating-color areas of interlaced color mask 6, the respective areas of system 2 will repetitively appear in different colors to an observer with the overall brightness of the system substantially enhanced by the retroreflectivity of underlying film 8. Thus, the visibility and conspicuity of the device employing system 2 can be enhanced using color variations rather than varying brightness. The colors of alternating areas of color mask 6 can be advantageously selected from the group of colors that are most noticeable and conspicuous to humans and/or can make a strong contrast, such as, for example, white (or no color), black, red, yellow, orange, blue, and green.

By way of example and not limitation, referring further to the structure depicted in FIG. 11 and FIG. 17, interlaced color mask 6 may be formed by interlacing narrow bands of two types: one being colorless and the other having a specific color, such as red. Such mask can be cut out of a red-color transmissive film and then laminated between lens array 4 and retroreflective film 8. An optically transparent adhesive may be used to glue the sandwiched structure together. The colorless areas will thus be formed by the mask openings disposed between the colored areas. The openings will thus define retroreflective areas 14 by exposing the respective portions of the underlying retroreflective film 8. The red-colored areas of mask 6 will define separation areas 30. Although separation areas 30 of this embodiment are also configured to transmit and retroreflect light, this being a variation of the foregoing embodiments described earlier with a reference to FIG. 17 and reciting opaque separation areas 30, the retroreflection is somewhat different from that exhibited by areas 14. The light passes twice through a color layer of separation area 30 which communicates said color to the retroreflected beam while the light retroreflected by area still 14 carries no color. Therefore, the optical properties of light exiting from system 2 will be different depending on whether retroreflective areas 14 or separation areas 30 are illuminated. Accordingly, the sequence and sizing of alternating areas 14 and 30 can be selected with respect to the dimensions of lens array 4 so that the pitch of lenses 8 is a multiple of the pitch of either retroreflective areas or separation areas thus enabling the illumination and retroreflection for only one area type at a time.

The entire exposed area of system 2 or least a portion of it can be configured with the above described color-encoded lenticular structure and properties. When such system 2 is exposed to light which direction changes from a normal incidence to a grazing angle with respect to surface 20 of lens array 4, system 2 will repetitively flash with changing colors, from red to no color and back, until the acceptance angle of lenses 12 and/or retroreflectors 15 is reached.

According to a further variation of system 2, separation areas 30 may be configured to retroreflect the incident light with an offset angle of retroreflection compared to retroreflective areas 14. It can be preferred that the offset angle is sufficient large so that the beams retroreflected by areas 14 do not intersect with the beams retroreflected by areas 30 and the intended observer can generally view either the light retroreflected by areas 14 or the light retroreflected by areas 30 at a time, depending on the observation angle and/or the angle between the light source and a normal to surface 20 or lens array 4. The different retroreflection may be provided, for example by using a prismatic or cube-corner retroreflective structure with the angle between reflective faces being other than 90°. It will be understood that even when similar retroreflective structures, such as linear prisms, are used for retroreflective area 14 and separation area 30, by providing a relatively small difference in facet angle of only a few degrees or less, the respective areas will retroreflect the incident light into different directions and can be configured so that only one area type is visible in the retroreflected light from any given viewing angle. Alternatively, the different retroreflection for areas 30 may be provided by right-angle cube-corners or prisms which optical axis is tilted with respect to the normal of surface 10 in which the retroreflectors are formed. The different retroreflective properties of separation areas 30 can be useful, for example, for providing brightness variations for an observer not being on the same line of view with respect to system 2 as the light source, such as providing a flashing effect for a sign to be viewed by a car driver in the lights of other passing cars.

It will be understood that other optical effects can be encoded and displayed by system 2 under the exposure to a moving distant light source. Also, interlaced mask 6 may employ other optical principles to create various visual effects and provide distinct, conspicuous appearances of the encoded image frames using the same basic structure of system 2. The above example of forming mask 6 based on different levels of transparency/opacity or colors have been demonstrated for the sake of simplicity and without limiting the scope of this invention.

While the foregoing embodiments have been described upon the case where retroreflective lenticular system 2 has a planar shape, the present invention is not limited to this and can be applied to the case where system 2 has a curved shape in order to provide its visibility from a broader range of directions. By way of example and not limitation, system 2 can be made flexible and can be wrapped around objects. In a more particular example, referring to FIG. 25, system 2 can be applied to a plastic or rubber road sign cone which is on roads under repair. In a further non-limiting example shown in FIG. 26, system 2 is wrapped around a road marking pole while having the same basic structure and operation. The lenticular lens array 4 and the underlying interlaced pattern of retroreflective areas 14 and separation areas 30 can be implemented in either horizontal or vertical orientation to provide for various attention catching visual effects depending on the change of illumination/observation angle in either horizontal or vertical direction, respectively.

This invention is also not limited in applications to improving the night time visibility of signs and displays under the illumination by automotive headlights, but can also be applied to a number of other applications. By way of example, retroreflective lenticular system 2 can be used for various markings and advertizing indoor or outdoor, in daylight or under any artificial light source.

Further details of operation of retroreflective lenticular system 2 shown in the drawing figures as well as its possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A retroreflective lenticular system comprising:
a first surface incorporating an array of lenses; and
a second surface extending parallel to said first surface and spaced apart from said first surface by an effective focal distance characterizing said lenses,
wherein at least one region of said second surface comprises a plurality of retroreflective areas spaced apart from each other and alternating with non-retroreflective separation areas according to a predetermined pattern.

2. A retroreflective lenticular system as recited in claim 1, wherein said lenses have cylindrical configurations and are arranged in parallel columns.

3. A retroreflective lenticular system as recited in claim 1, wherein said lenses have point-focus configurations and are arranged in rows and columns.

4. A retroreflective lenticular system as recited in claim 1, wherein said retroreflective areas and said separation areas form a repeating pattern.

5. A retroreflective lenticular system as recited in claim 1, wherein said predetermined pattern represents two or more different images or patterns interlaced into a single interlaced image or pattern.

6. A retroreflective lenticular system as recited in claim 1, wherein the pitch of said lenses is a multiple of the pitch of said plurality of retroreflective areas and said multiple is an integer number greater than 1.

7. A retroreflective lenticular system as recited in claim 1, wherein the transversal width of said retroreflective areas is substantially equal to the width of said separation areas.

8. A retroreflective lenticular system as recited in claim 1, wherein said region is configured to display one or more dynamic visual effect selected from the group consisting of flashing, color change, flip, animation, morph, and zoom, when said region is viewed through said array of lenses.

9. A retroreflective lenticular system as recited in claim 1, wherein each of said lenses is selected from the group consisting of imaging lenses, non-imaging lenses, spherical lenses, aspherical lenses, cylindrical lenses, point-focus lenses, Fresnel lenses, TIR lenses, gradient index lenses, and diffraction lenses.

10. A retroreflective lenticular system having a layered structure comprising:
an optical layer having a plurality of light focusing structures;
a retroreflective layer; and
an interlaced optical mask provided between said optical layer and said reflective layer,
wherein said interlaced optical mask comprises a predefined pattern of optically transmissive window areas spaced apart from each other and alternating with separation areas, said separation areas having different optical properties compared to said optically transmissive window areas.

11. A retroreflective lenticular system as recited in claim 10, wherein said transmissive window areas and said separation areas form a repetitive pattern and the pitch of said plurality of light focusing structures is a multiple of the pitch of said transmissive window areas or said separation areas, and wherein said multiple is an integer number greater than 1.

12. A retroreflective lenticular system as recited in claim 10, wherein said interlaced optical mask is configured to encode the content of two or more different images, symbols or patterns by means of lenticular interlacing.

13. A retroreflective lenticular system as recited in claim 10, wherein said interlaced optical mask is configured to display one or more dynamic visual effect selected from the group consisting of flashing, color change, flip, animation, 3D, morph, and zoom.

14. A method of manufacturing an optical article for repetitive displaying surface portions in varying brightness under illumination by a moving distant source of light, said method comprising:
  providing a lenticular lens array;
  providing a retroreflective layer positioned at a focal distance from said lenticular lens array; and
  forming an inverted interlaced mask between said lenticular lens array and said retroreflective layer, said inverted interlaced mask encoding a repetitive sequence of said varying brightness.

15. The method of claim 14, wherein forming said inverted interlaced mask comprises a process of interlacing of multiple image content into a single interlaced image.

16. The method of claim 14, wherein forming said inverted interlaced mask comprises a process selected from the group consisting of offset printing, digital printing, and laminating.

* * * * *